United States Patent [19]

Petersen et al.

[11] Patent Number: 4,533,303
[45] Date of Patent: Aug. 6, 1985

[54] HYDROSTATIC CONTROL DEVICE, PARTICULARLY STEERING DEVICE

[75] Inventors: Hans C. Petersen, Nordborg; Erik Kyster, Augustenborg; Svend E. Thomsen, Nordborg, all of Denmark

[73] Assignee: Danfoss A/S, Nordborg, Denmark

[21] Appl. No.: 550,319

[22] Filed: Nov. 21, 1983

[30] Foreign Application Priority Data

Nov. 24, 1982 [DE] Fed. Rep. of Germany ....... 3243400

[51] Int. Cl.³ .......................... F03C 2/08; F16H 31/02
[52] U.S. Cl. .................................... 418/61 B; 60/384; 137/625.21
[58] Field of Search ........................ 418/61 B; 60/384; 137/625.21

[56] References Cited

U.S. PATENT DOCUMENTS 4,232,708 11/1980 Miller ............................... 60/384 X
4,251,194  2/1981 Petersen ............................ 418/61 B
4,316,707  2/1982 Hansen et al. ................. 418/61 B X Primary Examiner—John J. Vrablik
Assistant Examiner—Theodore Olds
Attorney, Agent, or Firm—Wayne B. Easton

[57] ABSTRACT

A geroter hydrostatic steering control is disclosed in which the directional valve is spring biased to a neutral position. The rotor, the commutating valve, the rotor casing and the directional valve are all axially aligned adjacent to each other thus reducing the overall axial length of the device.

11 Claims, 17 Drawing Figures

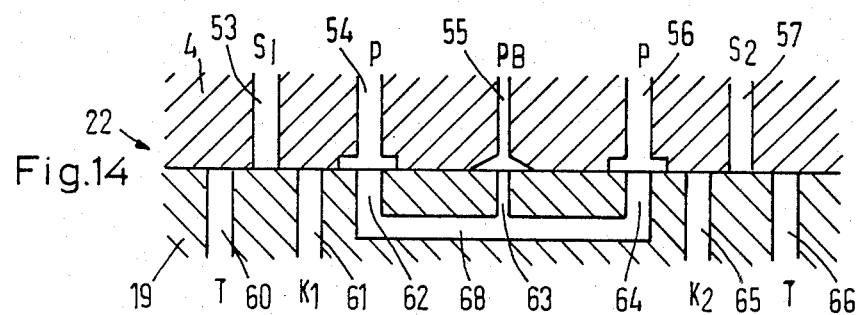
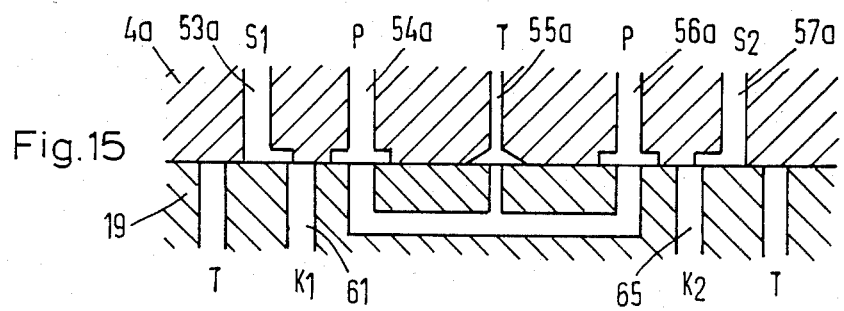
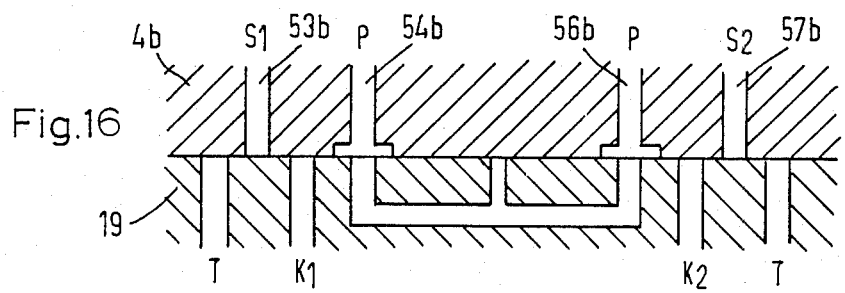
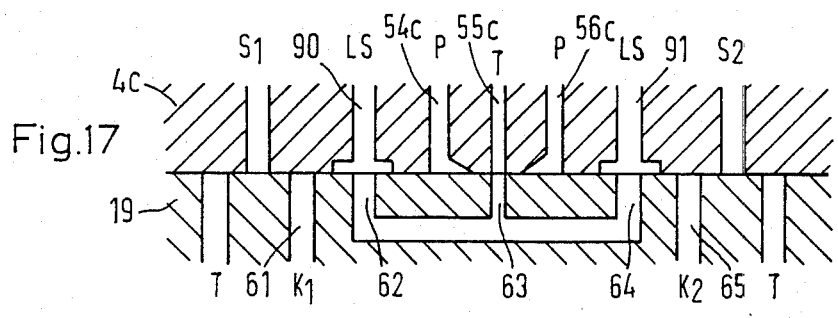

HYDROSTATIC CONTROL DEVICE, PARTICULARLY STEERING DEVICE

The invention relates to a hydrostatic control device, particularly a steering device, comprising an outer housing with an end wall, a metering motor arranged therein comprising compression chambers, a first motor part rotatable against the force of a neutral position spring relatively to the outer housing through an angle fixed by rotation limiting means and a second motor part in the form of a rotor connected to a control shaft, a directional valve having first control orifices connected to the outer housing and second control orifices connected to the first motor part, and a distributing valve having first control orifices connected to the first motor part and second control orifices connected to the rotor.

In a known hydrostatic control device of this kind (DE-PS No. 30 36 797) for actuating a steering motor, the metering motor is formed by a radial piston machine of which the pistons are adjusted in the radial direction along a circumferential track. The track is provided at the inner periphery of the motor housing which has a throughgoing bore. The latter is traversed over its entire length by the rotor in the form of a piston carrier. An outer end wall of the outer housing is provided with connections and inlet and outlet passages. The directional valve is formed by control orifices in the cylindrical circumferential surfaces of the outer housing and the motor housing, and the distributing valve is formed by cylindrical circumferential surfaces of the motor housing and piston carrier.

This construction requires considerable machining because two concentric pairs of cylindrical surfaces must be produced with very close tolerances. In addition, comparatively long passages produce increased flow resistances because the arriving liquid distributed over annular passages first flows outwardly through radial passages and must then be lead radially inwardly again. The same applies to the outflowing liquid.

In another hydrostatic control device (DE-PS No. 30 23 775) the metering motor is formed by a rotary piston machine having an internal axis, wherein an internally toothed gear ring, serving as the rotor, is fixed to the motor housing and the control shaft. An externally toothed gear forming compression chambers with the gear ring is connected by a Cardan shaft to a plate which is moveable through a limited angle of rotation and, together with adjoining housing plates on both sides, forms the directional valve. For the purpose of forming the distributing valve, the externally toothed gear is connected to an annular plate which connects the compression chambers in the correct sense to a radially outer or radially inner discharge chamber. This construction is expensive because of the number of parts. Mounting of the rotating motor housing in the internal housing presents difficulties. Since the Cardan shaft cannot be coupled without play to the externally toothed gear and the plate of the directional valve, inaccuracies occur during operation of the directional valve. In particular, in the neutral position the rest position of the said gear relatively to the valve plate depends on the last direction of rotation.

The invention is based on the problem of providing a hydrostatic control device of the aforesaid mentioned kind which can be made much more simply and with shorter passages.

This problem is solved according to the invention in that the motor housing has at one end a passage plate which is fixed to the first motor part, one side of the plate forming the direction of the valve together with the adjacent side of the outer housing end wall and the other side forming the distributing valve together with the adjacent side of the rotor.

In this construction, the directional valve and the distributing valve are formed by axially adjacent flat slides. The effective slide faces are planar and parallel and therefore simple to machine. The connections at the end wall of the outer housing between the connections and the directional valve, as well as the connections within the passage plate between the directional valve and the distributing valve can be kept short. The flow losses are correspondingly low. Another advantage is that the diameter as well as the axial length of the control device can be kept small. Further, it is favourable that no rotational bearing must be provided in the outer housing for the motor housing. The motor housing can be very accurately axially mounted between the two end walls of the outer housing and the rotor can be accurately mounted between the passage plate and the opposite end wall of the motor housing.

It is particularly favourable if the passage plate is applied to the end of the motor housing remote from the control shaft. In this way, a comparatively large surface is available in contrast with the side of the motor housing through which the control shaft passes. The designer therefore has considerable freedom in designing the control orifices of the directional valve. The spacing between the control orifices can be kept large so that the leakage losses are also small.

The directional valve depends on the nature of the metering motor employed. For example, in vane-type and similar machines, the control orifices in the passage plate may be crescent-shaped grooves whereas the control orifices at the rotor are formed directly by the sides of the compression chambers. In the case of rotary piston machines, the known distributing valve configurations can be employed. It is in this case particularly advantageous if the metering motor is a gear machine with internal axis and the distributing valve is formed by the side of the externally toothed gear forming the rotor together with the adjacent side of the passage plate. This gives the least possible constructional parts and the smallest possible axial dimension.

It is also of advantage if the rotation limiting means and/or the neutral position springs are disposed in the middle of the side forming the directional valve. At this position the rotation limiting means or neutral position springs can be applied without difficulty, in particular without increasing the external diameter. Nor do they collide with the control orifices of the directional valve. From a constructional point of view it is advisable for the end wall of the outer housing and the passage plate each to have at their confronting sides a depression forming at least the corners of a rectangle and for a compressible spring element to be disposed between two stiff supporting bars projecting into both depressions. In this way, the neutral position springs and limiting means are combined with each other.

If the spring element consists of two leaf springs curved towards each other, a simple and space-saving construction is obtained.

It is also favourable if the passage plate is secured by a parallel screw to the rest of the motor housing but the screw holes terminate in front of the side forming the directional valve. In this way, a comparatively large end face is available so that there is sufficient space for applying control orifices and other functionally important passages, recesses and the like.

In some cases, it is favourable if the end wall forming part of the directional valve is fitted as an insert into a pot-shaped outer housing through the base of which the actuating element passes. This gives a very small diameter for the control device because one can dispense with tensioning screws in the outer housing. The short length and small diameter lead to a very small overall size.

With advantage, at least the end of the outer housing and/or the passage plate consists of permanently interconnected superposed passage or apertured plates. In this way, the required control orifices and the associated connecting passages can be accommodated in a plate which is manipulatable as a whole. The individual plates can for example be stamped and then interconnected by adhesion, hot soldering or welding.

In a further development of the invention, the motor housing is supported by an axial roller bearing against an axially adjustable bushing which envelopes the control shaft. The motor housing can be loaded from the outside by axial forces produced by the pressure medium which is effective at least in part between the end faces of the directional valve. This axial force is received by the roller bearing, the play between the two end faces of the directional valve being accurately set with the aid of the bushings.

If a connecting plate having connections is provided on the side of the outer housing end wall remote from the metering motor, it is recommended that at least one further intermediate plate having at least one valve and connecting passages be provided between the end wall and connecting plate. This leads to a modular construction in which only one or more intermediate plates have to be selected depending on the application, whereas the motor housing and the other outer housing are retained without change. In this way, one also achieves rational production. The valve in the intermediate plate can, for example, be a priority valve, an over-pressure valve, a flow distributing valve or the like.

It is also favourable for a leakage oil passage to lead from the interior of the externally toothed internal gear over depressions in the passage plate and the end wall to a connection at the end wall. By utilising the depressions, one obtains a leakage oil passage having a very low flow resistance and comparatively short distance to the connection. To form the directional valve, it is advantageous for the control orifices in the passage plate to comprise a set having the following connections in the circumferential direction: a container control orifice, a metering motor control orifice, leading to a set of the supply or outlet orifices, a pump control orifice, at least one neutral position control orifice, a further pump control orifice, a metering motor control orifice leading to the other set, as well as a second container control orifice, the two pump control orifices and the neutral position control orifice being interconnected by way of a passage in the passage plate and the end wall of the outer housing being replaceable for adapting to different operating conditions. In the described distribution of the control orifices of one set, slight modifications in the end walls can produce steering devices having very different properties, for example of the type "power beyond" (excess oil goes to a further operating circuit in the neutral position); "open centre reaction", "closed centre, non-reaction" or "load sensing".

It is also possible for a plurality of sets to adjoin circumferentially, the adjacent sets each having a common container control orifice. In this case, the control orifices can be kept smaller for a particular amount of throughflow.

It is here recommended that the number of sets provided in the circumferential direction be smaller than the number of control orifices of the distributing valve and that the passage plate have a passage system in each case connecting one control orifice of the directional valve to at least two control orifices of the distributing valve. One can then arrange the control orifices of the directional valve at a sufficiently large spacing from each other and nevertheless feed a higher number of control orifices of the distributing valve.

Advantageously, the at least one neutral position control orifice has the form of a radial slot which cooperates with a radial slot in the outer housing end wall. In the neutral position, therefore, a comparatively large cross-section is effective so that pressure fluid can flow off to the container with little resistance. However, small angles of rotation will suffice to reduce this cross section severely or make it zero.

Preferred examples of the invention will now be described in more detail with reference to the drawing wherein:

FIG. 14 is a development of both parts of the directional valve for "power beyond" operation;

FIG. 15 is a development of both parts of the directional valve for "open centre, reaction" operation;

FIG. 16 is a development of both parts of the directional valve for "closed centre, non-reaction" operation; and FIG. 17 is a development of both parts of the directional valve for "load sensing" operation.

Figure 1:
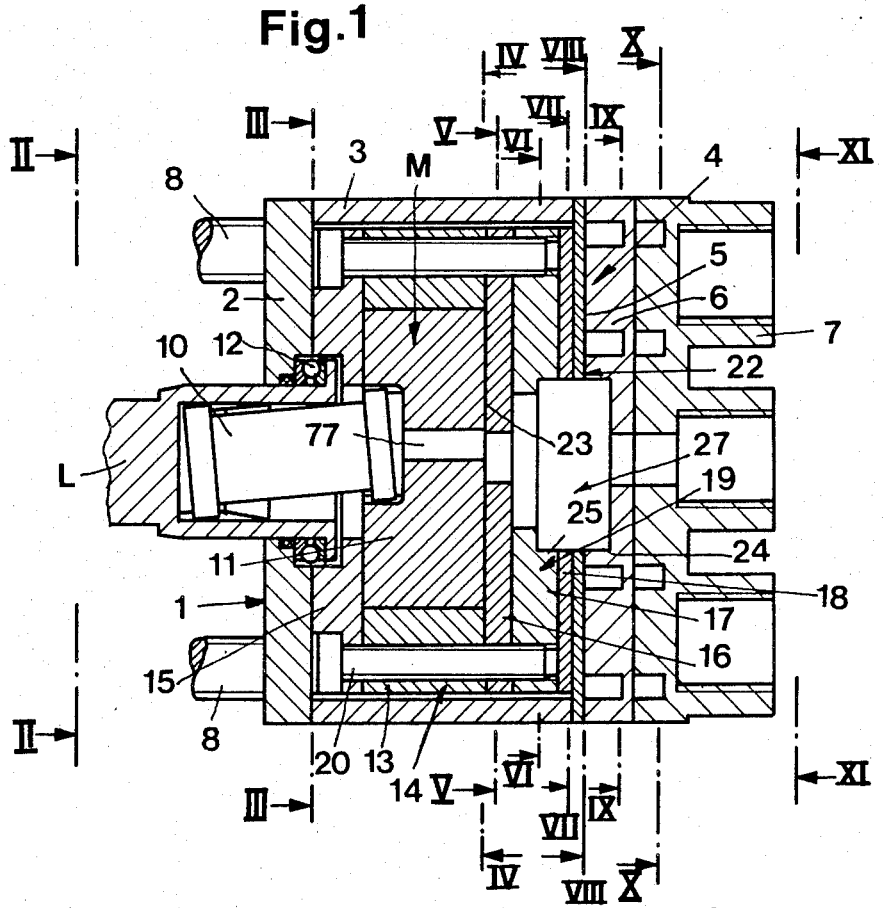
FIG. 1 is a diagrammatic longitudinal section through a control device according to the invention.

In the example of FIGS. 1 to 11, an outer housing 1 consists of an end wall 2, a sleeve 3, an end wall 4 made of an apertured plate 5 and a passage plate 6 soldered thereto as well as a connecting plate 7. These parts are all held together by tensioning screws 8 engaging through suitable holes 9.

A control shaft L in the form of a steering shaft with steering wheel is connected by a Cardan shaft 10 to a rotor 11 in the form of an externally toothed internal gear and is supported by way of an axial bearing 12 at the end plate 2. A second motor part 13 is formed by an internally toothed gear ring which is part of a motor housing 14 of a gear metering motor M with internal axis. The motor housing additionally comprises an end plate 15 and a passage plate 19 consisting of apertured and passage plates 16, 17 and 18 which are soldered together. These parts are interconnected by tension screws 20. They engage through holes 21 in the end plate 15, motor part 13 and plate 16 and 17 covered by the plate 18. The sides of the end wall 4 and of the passage plate 19 form a directional valve 22. The opposite side of passage plate 19 forms a distributing valve 23 together with the side of rotor 11.

Figure 8:
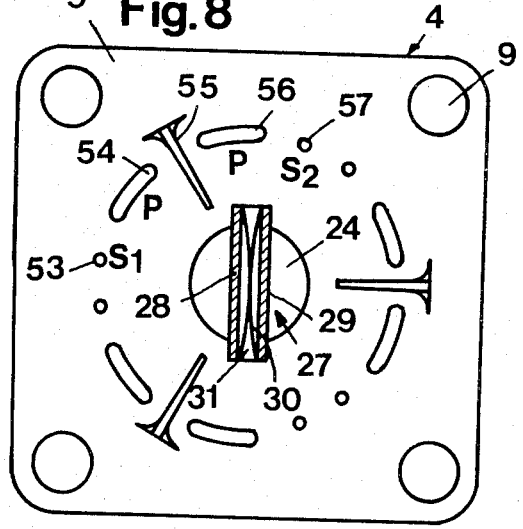
FIG. 8 is a section through the outer housing on the line VIII—VIII in FIG. 1.
Figure 9:
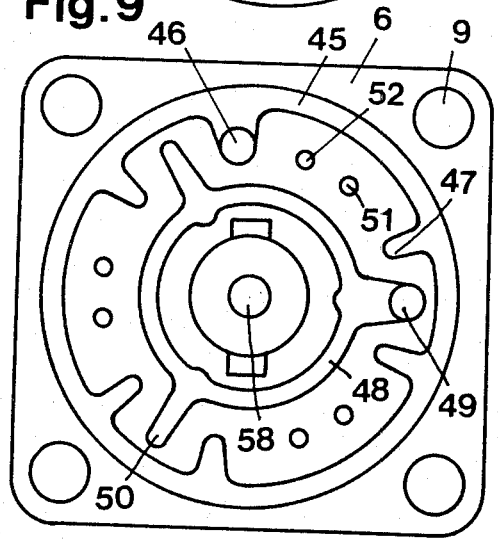
FIG. 9 is a section through the outer housing on the line IX—IX in FIG. 1.
Figure 3:
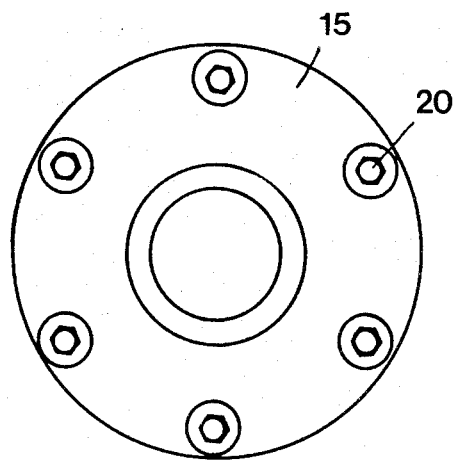
FIG. 3 is an elevation of the motor housing corresponding to the line III—III in FIG. 1.

In the middle of the end wall 4 and passage plate 19, there are depressions 24 and 25 which form the corners 26 of a rectangle. Inserted in both depressions there are rotation limiting means 27 in the form of two supporting bars 28 and 29. Between these bars extend two neutral position leaf springs 30 and 31 curves towards each other as shown in FIG. 8. This arrangement consistutes the sole mechanical connection between the motor housing 14 and outer housing 1. It permits relative rotation of the motor housing, relatively to the outer housing, through a few degrees.

Figure 11:
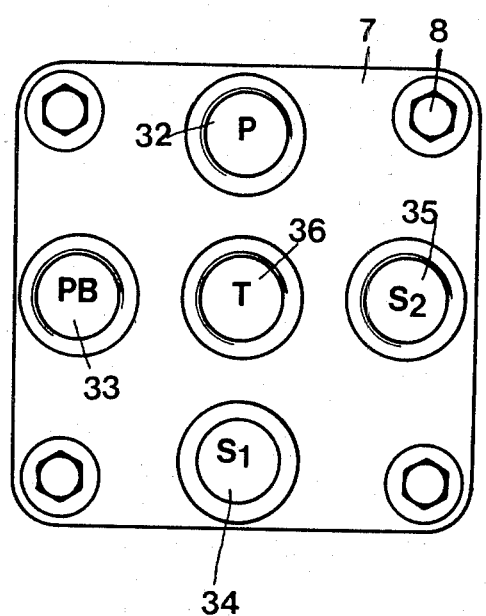
FIG. 11 is a section of the outer housing on the line XI—XI in FIG. 1.

The connecting plate 7 carries five connections 32 to 36 (FIG. 11). The connection 32 leads to the pump P, the connection 33 to the container T or to a second operating circuit PB, the connection 34 leads to a connection $S_1$ of a steering motor, the connection 35 leads to the other connection $S_2$ of the steering motor and the connection 36 leads to the container T.

Figure 10:
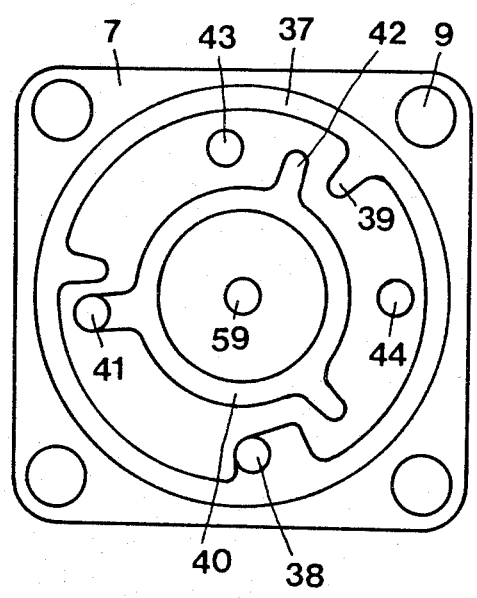
FIG. 10 is a section through the outer housing on the line X—X in FIG. 1.

An annular groove 37 in the connecting plate 7 connects a bore 38 leading to the connection 34 with three branch passages 39 uniformly distributed over the circumference. An annular passage 40 connects a bore 41 leading to the connection 35 with three branch passages 42 uniformly distributed over the circumference. A throughgoing bore 43 is located at the level of the connection 32 and a throughgoing bore 44 at the level of the connection 33. (FIG. 10.)

An annular groove 45 in the plate 6 (FIG. 9) connects a through-going bore 46 flush with the throughgoing bore 43 with six branch passages 47 uniformly distributed over the circumference. A further annular groove 48 connects a throughgoing bore 49 flush with the throughgoing bore 44 to three branch passages 50 uniformly distributed over the circumference. Throughgoing bores 51 are aligned with the branch passages 39 and throughgoing bores 52 with the branch passages 42 of connecting plate 7.

In this construction, the plate 5 of end wall 4 comprises three sets of control orifices for forming the directional valve 22, each comprising the following in the circumferential direction: an operating motor control orifice 53, a pump control orifice 54, a neutral position control orifice 55, a pump control orifice 56 and a second operating motor control orifice 57 (FIG. 8). The operating motor control orifice 53 communicates by way of the flow path 51-39-37-38-34 with the one connection $S_1$ of the steering operating motor. The two pump control orifices 54 and 56 communicate with the pump P by way of the flow path 37-45-46-43-32. The operating motor control orifice 57 communicates with the other connection $S_2$ of the steering operating motor by way of the flow path 52-42-40-41-35. The neutral position control orifice 55 formed by a radial slot communicates by way of the flow path 50-48-49-44-33 with the subsequent installation PB or the container T. The depression 24 communicates by way of a central bore 58 in plate 6 and a bore 59 in plate 7 with the connection 36 and thus with the container T.

Figure 7:
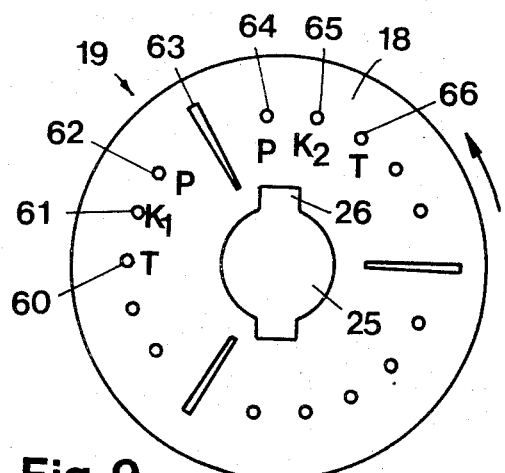
FIG. 7 is a section through the motor housing on the line VII—VII in FIG. 1.

Three sets of control orifices are again provided in plate 18 of passage plate 19, namely a container control orifice 60, a first metering motor control orifice 61 leading to the connection $K_1$, a pump control orifice 62, a neutral position control orifice 63, a further pump control orifice 64, a second metering motor control orifice 65 leading to the connection $K_2$ and a container control orifice 66 which is at the same time the first container control orifice of the next set (FIG. 7.)

The adjacent plate 17 (FIG. 6) of passage plate 19 has three radial grooves 67 which connect the container control orifices 60 and 66 to the container 36 by way of the flow path 25-24-58-59-36. Depressions 68 serve to interconnect the pump control orifices 62 and 64 and the neutral position control orifice 63. Throughgoing holes 69 and 70 are in registry with the metering motor control orifices 61 and 65.

Figure 5:
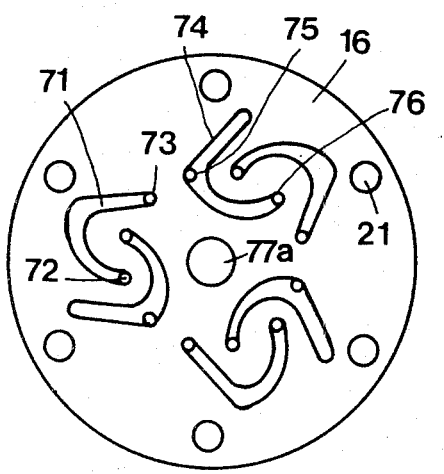
FIG. 5 is a section through the motor housing on the line V—V in FIG. 1.

The plate 16 shown in FIG. 5 comprises three grooves 71 each communicating by way of a throughgoing bore 69 with a metering motor control orifice 61 and leading to two control orifices 72 and 73 of the distributing valve 23 that are open towards the rotor 11. Three further grooves 74 each connected to a second metering motor control orifice 65 by way of a throughgoing bore 70 feed a respective two control orifices 72 and 73 and lie on the same circle. These control orifices 72,73,75 and 76 are shown in FIG. 5 although they do not lie in the plane of the drawing.

Figure 4:
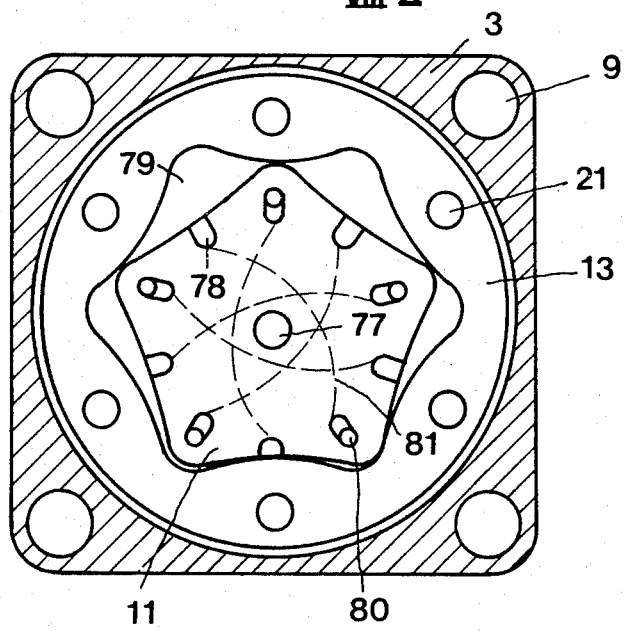
FIG. 4 is a section through the steering device on the line IV—IV in FIG. 1.
Figure 2:
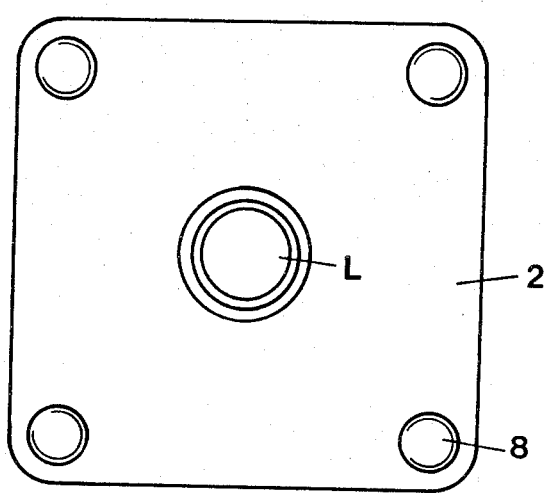
FIG. 2 is an elevation of the outer housing corresponding to the line II—II in FIG. 1.
Figure 6:
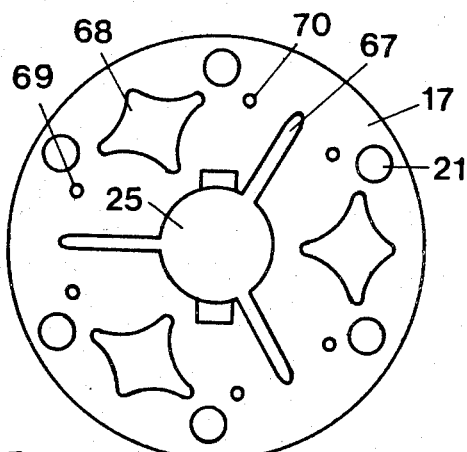
FIG. 6 is a section through the motor housing on the line VI—VI in FIG. 1.

FIG. 4 shows that the rotor 11 has a central bore 77 connected by way of a central bore 77a in plate 16 to the container connection 36 so that leakage oil can flow off. In addition, to form the distributing valve 23, the end face facing the passage plate 19 is provided with first control orifices 78 which each open into a compression chamber 79 and second control orifices 80 connected within the motor part 11 to the opposite control orifice 78 by way of passages 81 which are only indicated in outline. During the trocoidal motion executed during operation by the externally toothed internal gear forming the rotor 11, the control orifices 78 and 80 so communicate with the control orifices 72,73,75 and 76 that the compression chambers 79 are meaningfully filled and emptied.

In the rest or neutral position of the directional valve 22 brought about by the neutral position springs 30, 31 the pump connection 32 is connected to the connection 33 by way of the neutral position control orifices 55 and 63, so that the pressure fluid can be utilised in a second subsequent operating circuit. If the control shaft L is turned counterclockwise in FIGS. 7 and 8, not only the rotor 11 is carried along against the force of the neutral position springs but also entire motor 14 because the liquid is enclosed in the compression chambers 79. The path over the neutral position control orifices 55, 63 is closed. Instead, pressure fluid flows from the pump control orifice 56 over the metering motor control orifice 65 to the connection $K_2$ of metering motor M, and from its second connection $K_1$ over the metering motor control orifice 61 to the operating motor control orifice 53 and further to the operating motor connection $S_1$. From the other operating motor connection $S_2$, the liquid passes through the operating motor control orifice 57 to reach the container control orifice 66 and thus the container. The amount of pressure fluid passing through the metering motor M corresponds to the angle of rotation of the control shaft L so that this angle of rotation and the adjustment of the steering operating motor are proportional. When turning is stopped, the directional valve 22 returns to the rest position under the influence of the neutral position springs 30, 31. Upon rotation of control shaft L in the opposite direction, flow conditions are established in the reverse direction.

The two supporting bars 28 and 29 limit the possible relative rotation in the directional valve 22. If the pump is omitted, support of the motor housing 14 is at the outer housing 1, so that the rotor 11 can be turned with the aid of the control shaft L and the metering motor M be used as an auxiliary pump.

All the forces occuring in the compression chamber 79 are absorbed entirely in the motor housing 14. It is therefore only necessary to absorb forces in the outer housing 1 that are applied by the control shaft L and possibly forces rising out of the liquid pressure between the end wall 4 and passage plate 19. Since the passage plate 19 forms one side of the motor housing 14, there is no play between the metering motor and directional valve 22, thereby giving a high accuracy. The control device is axially short and can be produced with small external dimensions.

Figure 12:
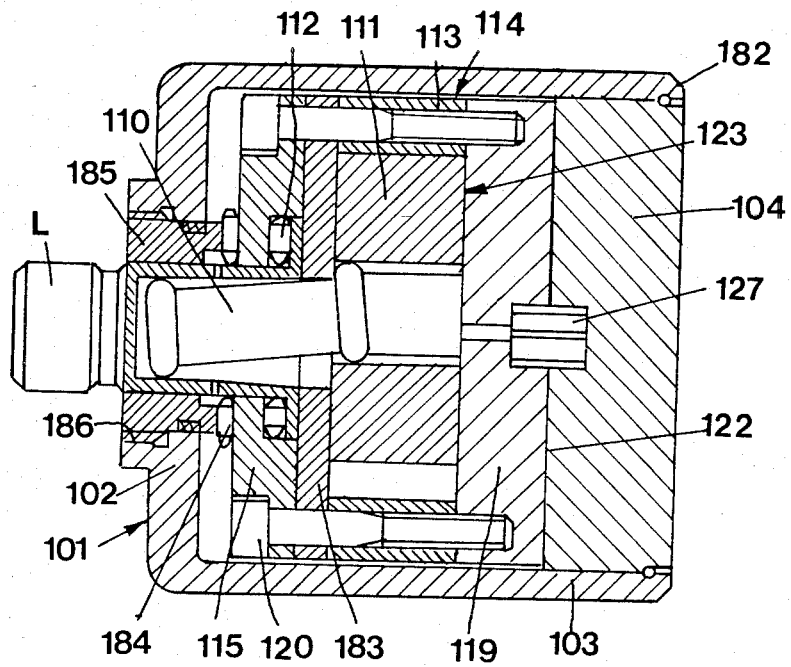
FIG. 12 is a diagrammatic section through another example of a steering device according to the invention.

In the FIG. 12 embodiment, corresponding parts have the same reference numerals, increased by 100. Many of the parts are very diagrammatic. The end wall 102 and sleeve 103 of the outer housing 101 are pot-shaped. The end wall 104 at the directional valve 122 is an insert in the pot and held therein by means of a split ring 182. The axial bearing 112 of control shaft L is disposed between the end plate 115 and an intermediate plate 183 of motor housing 114. A further axial bearing 184 is interposed between the side of motor housing 114 remote from the direction of valve 122 and a sleeve 185. This sleeve is adjustable in the outer housing 101 by means of a screw thread 186 so that the passage plate 119 can be held practically without play at the end wall 104.

Figure 13:
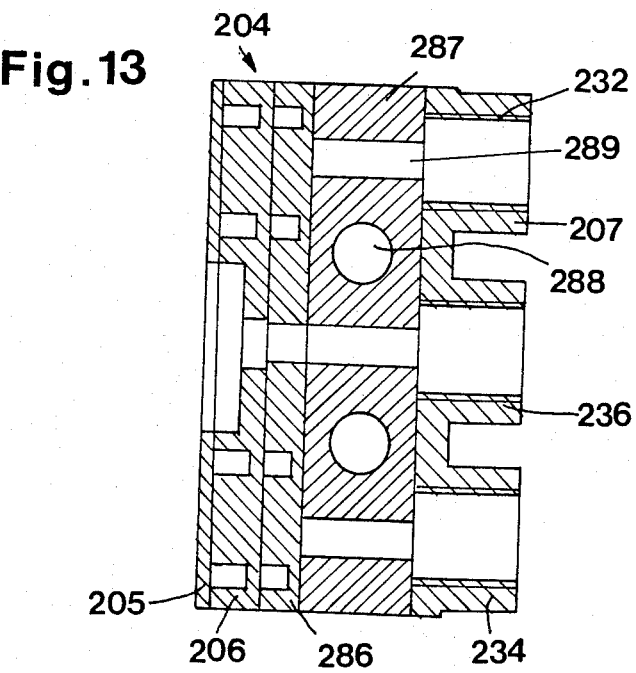
FIG. 13 is a modification, in section, of the end wall of the outer housing located on the right-hand side of the motor housing in FIG. 1.

In the FIG. 13 embodiment, plates 205 and 206 correspond to plates 5 and 6 in FIG. 1 and plate 286 corresponds to the left hand portion of connection plate 7 in FIG. 1. The said parts are unified to form an end wall 204 by means of soldering or the like. A connectingplate 207 has five connections of which the connections 232, 234 and 236 are visible. Between the end wall 204 and connecting plate 207, there is an intermediate plate 287 having at least one valve 288 and connecting passages 289. On clamping the outer housing together by means of the tensioning screws 8, one or more replaceable intermediate plates may be included to meet the particular requirements.

FIG. 14 illustrates a development of the directional valve 22 in cross section, only one set of the control orifices being shown. There are here an end wall 4 and a passage plate 19 which permit the "power beyond" operation. The reference numerals of the control orifices therefore correspond to those in FIGS. 7 and 8. The neutral position control orifice 55 is connected to the connection 33 and thus to a subsequent installation.

FIG. 15 is concerned with "open centre, reaction" type of operation. The same passage plate 19 is used but in conjunction with a modified end wall 4a. It will be seen that the operating motor control orifices 53a and 57a communicate in the neutral position with the associated metering motor control orifices 61 and 65 (reaction), and that the pump control orifices 54a and 56a communicate with the neutral position control orifice 55a which, in turn, leads to the container (open centre).

In FIG. 16, the same passage plate 19 is combined with a different end wall 4b which permits "closed centre, non-reaction" operation. For this purpose, the operating motor control orifices 53b and 57b are blocked in the neutral position (non-reaction), and the pump control orifices 54b and 56b are likewise blocked (closed centre).

In FIG. 17 the same passage plate 19 is combined with a modified end wall 4c which permits "load sensing" operation. For this purpose, the pump control orifices 54c and 56c are closer to the neutral position control orifice 55c and can co-operate with the neutral position control orifice 63 upon adjustment of the directional valve. Co-operating with the control orifices 62 and 64 there are two pressure sensing control orifices 90 and 91 which act on a control device for altering the pump output and are adapted to produce a connection to the metering motor control orifices 61 and 65.

In the examples, a rotary piston machine is provided as metering motor. This gives the advantage that a comparatively large amount of compression corresponds to a predetermined angle of rotation. One can, however, instead employ any other kind of rotary motor with internal axis, e.g. a vane-type machine, a radial or axial piston machine, a gear machine with fixed but eccentric axes, and the like. In all cases, the motor housing is carried along only over a small angle and thereby adjusts the movable part of the directional valve formed thereon. The equipment here designated as metering motor can in some applications also be operated as a pump.

We claim:

1. A hydrostatic steering control device, comprising, a housing have a plurality of ports including inlet and outlet ports and two motor ports connectable to an external servomotor, a metering motor having a casing rotatably mounted in said housing, a rotor mounted in said metering motor casing and being moveable relative thereto to form expansible and collapsible chambers, control shaft means for actuating said rotor, directional valve means for selectively directing pressurized fluid to and draining fluid from said motor ports, said directional valve means having opposite turn functions, said directional valve means having axially abutting planar faces respectively on said housing and said metering motor casing and being operable upon said shaft turning said casing and said rotor in unison, commutating valve means for selectively directing pressurized fluid to and drainage fluid from said motor means to impart directional movement thereto pursuant to the operation of said directional valve means, said commutating valve means being between said metering motor casing and said rotor, resilient means for maintaining said directional valve means in a neutral position in the absence of a turning force on said shaft, passage means cooperable with and connecting said housing ports with said directional valve means and said commutating valve means, said directional valve means being operable for each said turning function to (1) route pressure fluid from said inlet port through one side of said commutating valve means to expanding chambers of said metering motor and pressurized fluid from collapsing chambers of said metering motor to one of said motor ports and (2) route fluid from the other of said motor ports to said outlet port.

2. A control device according to claim 1 wherein said directional valve means is at the end of said metering motor casing remote from said control shaft means.

3. A control device according to claim 1 wherein said metering motor is a gerotor type gear unit with said rotor being an externally toothed star element and said casing including an internally toothed ring element.

4. A control device according to claim 3 including a leakage oil passage internally of said star element and leading to said outlet port.

5. A control device according to claim 3 wherein said housing includes sidewalls in sealing engagement with said star element, said commutating valve means being between at least one of said wall means and said star element.

6. A control device according to claim 1 wherein an internal space is formed between said metering motor casing and said housing in the center of and on opposite sides of said directional valve planar faces, said resilient means being disposed in said internal space.

7. A control device according to claim 6 wherein said resilient means comprises compressible spring elements, and rotation limiting means being disposed in said internal space.

8. A control device according to claim 6 wherein said resilient means comprise two leaf springs curved towards each other.

9. A control device according to claim 1 wherein said housing is cup shaped with the bottom thereof having an opening to accomodate said control shaft means, and plate means at the opposite end of said cup shaped housing to accomodate said plurality of ports.

10. A control device according to claim 1 including a bushing surrounding said control shaft means and being axially adjustable relative to said housing to provide a desired clearance between said planar faces of said directional valve means.

11. A control device according to claim 1 wherein said planar faces have neutral position radially extending slots which are aligned when said control device is in a neutral position.

* * * * *